United States Patent [19]

Monks

[11] 4,125,178
[45] Nov. 14, 1978

[54] DRIVE MECHANISM

[75] Inventor: Harry Monks, Burton-on-Trent, England

[73] Assignee: Coal Industry (Patents) Limited, London, England

[21] Appl. No.: 753,895

[22] Filed: Dec. 23, 1976

[30] Foreign Application Priority Data

Jan. 15, 1976 [GB] United Kingdom ............... 01569/76

[51] Int. Cl.² .......................................... F16D 67/04
[52] U.S. Cl. .................................. 192/18 A; 74/661; 192/12 C
[58] Field of Search .............. 192/12 C, 18 A; 74/661

[56] References Cited

U.S. PATENT DOCUMENTS

| 3,213,711 | 10/1965 | Van Den Kieboom | 74/611 |
| 3,797,623 | 3/1974 | Gregorovich et al. | 192/18 A |
| 3,860,100 | 1/1975 | Spanke et al. | 192/18 A |
| 3,912,058 | 10/1975 | Parkins | 192/18 A |

FOREIGN PATENT DOCUMENTS

| 1,221,638 | 2/1971 | United Kingdom | 192/18 A |
| 1,361,465 | 7/1974 | United Kingdom | 192/18 A |
| 1,399,245 | 6/1975 | United Kingdom | 192/18 A |
| 1,399,246 | 6/1975 | United Kingdom | 192/18 A |

Primary Examiner—Ronald C. Capossela
Attorney, Agent, or Firm—Stevens, Davis, Miller & Mosher

[57] ABSTRACT

An auxiliary drive is provided for a drive mechanism for a conveyor, the mechanism including a brake and clutch arrangement designed to facilitate the starting and stopping of the conveyor. The auxiliary drive is conveniently mounted on the mechanism and has a drive motor driving a gear through an intermediate pinion, a gear wheel fixed to the driven stage of the mechanism. The intermediate pinion is movable to engage both the gear wheel and gear to transmit drive from the motor to the driven stage but is actuable to discontinue such drive. The auxiliary drive is intended to provide a means whereby the driven stage may be run at a speed lower than its normal operating speed, a particular application being to conveyors of the scraper chain type which at times require tensioning or detensioning of the chain for maintenance purposes, but at speeds lower than can be achieved using the main drive motor.

7 Claims, 1 Drawing Figure

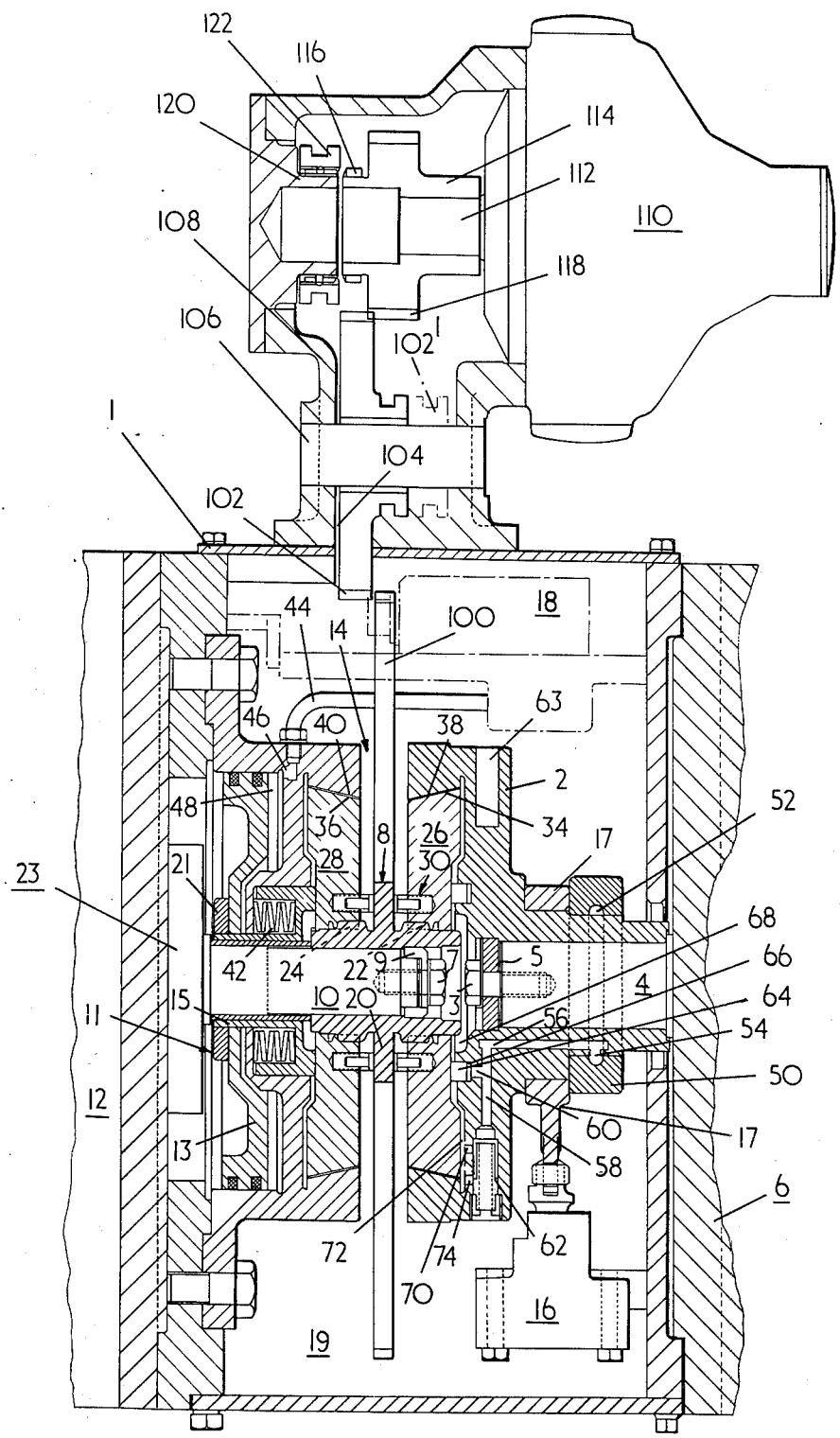

DRIVE MECHANISM

This invention concerns improvements in or relating to a drive mechanism.

In particular the invention has reference to a drive mechanism for a conveyor which may be loaded or partially loaded when the drive motor is started. Under such conditions conventional conveyor drives have the disadvantage that the motor is liable to stall when switched on causing the motor to overheat and eventually burn out. Furthermore, with the known conveyor drives, when the motor is switched off, the conveyor does not stop immediately because of the inertia effect in the moving parts. This can be dangerous for workmen operating in the vicinity of the conveyor, especially if the conveyor is on a longwall face of an underground coal mine where it may not be possible to move away from the conveyor.

When employing a drive mechanism for a conveyor which comprises one or more chains carrying or interconnecting a plurality of flight bars, e.g. an armoured flexible conveyor, it is at times necessary to tension or slacken the chains either during the installation of the conveyor or for the repair of a portion thereof. In this respect, however, it is advantageous to run the drive mechanism at a lower speed than that at which the conveyor is run under normal operating conditions.

An object of the invention is therefore to provide a drive mechanism which incorporates a facility for the running thereof at a lower speed than its normal operating speed.

Accordingly, there is provided a drive mechanism for a conveyor comprising a driving stage adapted to rotate with a motor, a driven stage adapted to drive a machine, a clutch adapted drivably to connect the driven stage to the driving stage, a brake biased to its applied position contacting the driven stage, control means which includes a control valve, a pump adapted to deliver pressure fluid and drivably connected to the driving stage, the control valve being associated with pressure fluid from the pump and the control means ensuring that, in operation, after the motor is started, the brake is moved to its released position before the driving and driven stages are drivably connected, the pressure fluid releasing the brake and engaging the clutch, a member mounted on the driven stage for rotation therewith, an auxiliary motor, and means for selectively engaging or disengaging drive between the auxiliary motor and the said member.

The control means may preferably include a solenoid valve.

The driving and driven stages may include two coaxial rotating shafts, of which one is in the driving stage and the other is in the driven stage, and of which one is hollow and the other is within the hollow shaft.

The member may conveniently comprise a gear wheel affixed to the driven stage and the auxiliary motor drives a gear.

The means for selectively engaging or disengaging the drive may include an intermediate pinion actuable to mesh with both the gear and the gear wheel to establish the drive and actuable to move out of mesh with the gear wheel and/or gear.

The drive mechanism is preferably housed within a casing and the auxiliary motor may conveniently be mounted on the casing.

By way of example only, one embodiment of a drive mechanism in accordance with the present invention is described below with reference to the accompanying drawing which shows a sectional view of a conveyor drive.

The drawing shows a drive for a longwall conveyor used in an underground coal mine. The drive comprises a casing 1 within which is a driving stage member 2 drivably mounted on the drive shaft 4 of an electric motor 6, and a driven stage 8, coaxial with the driving stage and drivably mounted on a driven shaft 10 of a gearbox 12 which in turn is drivably connected to a drive sprocket (not shown) of the conveyor. The member 2 is keyed onto the shaft 4 and is retained in position by a bolt 3 and washer 5. The driven stage 8 engages a spline on the shaft 10 and is retained in position by a bolt 7 and washers 9.

The drive also comprises a brake generally indicated by 14 fixedly mounted to the casing 1 and including a movable assembly generally indicated by 11 which comprises a piston 13 secured to a rod 15 by a nut 21 and which is slidable along a bush 23 on the shaft 10. A pump 16 for hydraulic fluid is secured to the casing 1 and is drivably connected to the member 2 through a collar 17 eccentrically mounted on the member. Hydraulic fluid is fed by the pump 16 from a sump 19 to a solenoid control valve 18 which is actuated by the pressure fluid to feed pressure to the drive in a manner as described later.

The driven stage 8 comprises a central bush 20 having two splines 22 and 24 adjacent to its ends, and two opposed discs 26, 28 slidably mounted on the splines 22, 24, respectively. The two discs 26, 28 are urged apart by six pairs of coil springs 30 (only two pairs of which are shown) equally spaced around the discs.

The discs 26, 28 have frusto-conical outer surface edges 34, 36 arranged to contact corresponding surface edges 38, 40 on the member 2 and brake 14, respectively. When the surface edges 34 and 38 are in contact the driven stage 8 is drivably connected to the member 2 corresponding to the drive position and when the surface edges 36 and 40 are in contact the driven stage 8 is braked, corresponding to the applied position.

The movable assembly 11 of the brake 14 is urged by six disc springs 42 so as to contact the disc 28 which is thus moved against the action of the springs 30 into the applied position.

The member 2 and the brake 14 are provided with bores and various hydraulically actuated devices which will be referred to during the description of the operation of the drive.

Other items for example the feed pipe from the pumps 16 to the control valve 18 and details of the pump 16 and valve 18 have been omitted for the sake of clarity.

The operation of the conveyor drive is as follows:

When the electric motor 6 is switched on the solenoid control valve 18 is simultaneously excited to feed pressure fluid to a spring loaded relay control valve (not shown) which is moved against its spring loading to feed pressure fluid along pipe 44 to the brake 14. The fluid passes through bore 46 into a chamber 48 where it urges the assembly 11 to slide along the shaft 10 against the action of the springs 42 and allows the disc 28 to slide along the spline 24 under the action of the springs 30 so that the surface edges 36 and 40 disengage, releasing the driven stage 8 from the brake 14.

By the time the brake 14 is released sufficient fluid has passed the relay control valve along a pipe (not shown)

to a stationary collar 50 secured to the casing 1 and slidably mounted on the member 2. The fluid passes along a bore (not shown) in the collar 50 into an annular groove 52 formed around the inner periphery of the collar. From the groove 52 fluid is fed into bores 54, 56, 58 and 60 in the driving stage member 2. Fluid is fed along bore 58 to a valve 62 which is spring loaded into the closed position, and along bore 60 to a ring 64 slidable in a recess 66. The member 2 has a blind bore 63 to counter balance the bores 54, 56, 58 and 60. The ring 64 is urged out of the recess 66 by the fluid pressure to contact the disc 26 which thus slides along the spline 22 against the action of the springs 30 until the surface edges 34 and 38 contact each other causing the driven stage 8 to start rotating and the conveyor to start running. At this point in time the surface edges 34, 38 are held in contact only by the force of the ring 64. Thus some slip occurs between the surface edges 34 and 38 and the conveyor is thereby started slowly.

As the fluid pressure in the bores 54, 56, 58 and 60 builds up the force holding the surface edges 34 and 38 in contact increases and less slip tends to occur and the conveyor's speed tends to gradually increase.

When the fluid pressure reaches a certain predetermined value, the spring loaded valve 62 is opened due to the pressure of the fluid in combination with the centrifugal force acting on the valve 62 as the member 2 rotates. When the valve 62 opens fluid is fed through bore 70 into an annular chamber 72 where the fluid pressure acts on the side of the disc 26 and the surface edges 34, 38 are held in contact with a force sufficient to prevent slip occurring. The driven stage 8 is now rotating with a speed equal to that of the motor 6 and the conveyor is running at full speed.

When the electricity supply to the motor 6 is switched off, the solenoid control valve 18 is simultaneously de-energized and the supply of fluid to the relay control valve is cut off so that the valve moves under its spring loading to cut off the supply of fluid to the collar 50. The pressure of fluid in the bores 54, 56, 58 and 60 falls due to exhausting of fluid to the sump 19. As soon as the fluid pressure falls the valve 62 is moved under the action of its spring to the closed position allowing the fluid in chamber 72 to be exhausted through bore 74 to the sump 19. The disc 26 slides along the spline 22 under the action of the springs 30, and the surface edges 34 and 38 disengage. The driven stage 8 and the motor 6 are now rotating independently of each other.

By the time the surface edges 34 and 38 have disengaged the relay control valve has moved under its spring loading to cut off the supply of fluid along the pipe 44 to the brake 14. As soon as the pressure of fluid in the chamber 48 is exhausted, the assembly 11 of the brake 14 is moved along the shaft 10 under the action of the springs 42 causing the disc 28 to move against the action of the springs 30 so that the surface edges 36 and 40 come into contact to apply the brake. The driven stage 8 and the conveyor which have only a relatively small stored inertia when running at full speed are quickly brought to rest. The motor 6 which when rotating at full speed has a relatively high stored inertia is allowed to rotate freely and to come to rest gradually.

The drive mechanism further comprises a member in the form of a gear wheel 100 mounted on the central bush 20 of the driven stage 8, the gear wheel 100 being engageable by an intermediate gear 102 which extends partially into the casing 1 through an aperture 104 provided for that purpose. The gear 102 is rotatably mounted on and slidable along a shaft 106 fixed in a housing 108 which is secured to the casing 1.

An auxiliary motor 110 is mounted on the housing 108 and has an output shaft 112 which carries a stepped pinion 114 with two sets 116, 118 of teeth, the teeth 118 meshing with the intermediate gear 102. The housing 108 is provided with an externally splined stub shaft 120 disposed in axial alignment with the pinion 114. An internally splined locking member 122 is engaged in slidable fashion with stub shaft 120 for a purpose to be indicated later in the specification.

The operation of the drive mechanism when employing the auxiliary motor 110 is as follows. When it is desired to effect drive to the gearbox 12 other than by using motor 6, for example if it is necessary to tension or slacken a chain (not shown) of the conveyor, the intermediate gear 102 is brought into meshing engagement, as shown at $102^1$ with the gear wheel 100 by means of a selector fork (not shown), the locking member 122 being retained in the disengaged position shown in full lines in the drawing. In moving the intermediate gear into this position indicated at $102^1$, an electrical circuit to the motor 6 is broken, thus preventing the motor from running when the intermediate gear 102 is engaged with gear wheel 100. Once the gear $102^1$ is meshed with wheel 100, the drive train between the pinion 114 mounted on the auxiliary motor shaft 112 is established. Upon actuation of the motor 110, the driven stage 108 and thus the shaft 10 of gearbox 12 is rotated independently of the motor 6.

When the driven stage 8 has been rotated by the auxiliary motor sufficiently to tension the conveyor chain a desired amount, the locking member 122 is moved to engage teeth 116 of the pinion 114 to lock the pinion 114 to the housing 108 to prevent counter rotation of the gear train which may tend to occur due to leakage of pressure fluid from the motor 110 which is switched off once the locking member is in its locked position.

Once the tensioned conveyor chain is connected the gear 102 is moved to the position indicated by the full line in the drawing to disengage the gear 100 and which thereby is free to rotate. In so moving the gear 102 the electrical circuit to the main drive motor 6 is re-established. Thus, the motor can be started to drive the conveyor in normal operational manner.

The drive mechanism of the present invention therefore provides a simple and yet effective means of driving the driven stage independently of the main motor and at a lower speed.

What is claimed is:

1. A drive mechanism for a conveyor including a casing and a primary motor; a driving stage mounted within the casing to be rotated by said motor; a driven stage mounted within the casing and adapted to drive a machine; a clutch interposed between the driving and driven stages and adapted drivably to connect the driven to the driving stage; a brake located on the driven stage and biased to its applied position; control means including a control valve, a pump adapted to deliver pressure fluid and drivably connected to the driving stage, the control valve being connected to receive pressure fluid from the pump; the control means being connected so that, in operation, after the motor is started, the brake will move to its released position before the driving and driven stages are drivably connected, means actuated by the pressure fluid to release the brake and to engage the clutch so as to connect the driving and driven stages; a member mounted on the driven stage for rotation therewith; an auxiliary motor mounted in association with the casing, and means for selectively engaging drive between the auxiliary motor and the said member.

2. A drive mechanism according to claim 1 in which the member is a gear wheel attached to the driven stage, and the auxiliary motor drives a gear.

3. A drive mechanism according to claim 2 in which the means for selectively engaging the drive includes an intermediate pinion actuable to mesh with both the gear and the gear wheel to establish the drive between the auxiliary motor and the gear wheel and actuable to move out of mesh with the gear wheel.

4. A drive mechanism according to claim 3 including a housing in which the gear and the intermediate pinion are located, and a shaft, the intermediate pinion being rotatably and slidably mounted on the shaft.

5. A drive mechanism according to claim 4 in which the auxiliary motor is fixed to the housing which is attached to the casing.

6. A drive mechanism according to claim 4 in which the housing is provided internally thereof with a stub shaft, and a locking member is engageable with the stub shaft and the gear and is adapted upon engagement to lock the gear to the housing.

7. A drive mechanism according to claim 3 in which the casing has aperture means and the intermediate pinion protrudes through the aperture means to engage the member mounted on the driven stage.

* * * * *